United States Patent Office 3,200,145
Patented Aug. 10, 1965

3,200,145
MANUFACTURE OF METHYL DICHLOROPHOSPHINE OXIDE
Leland J. Lutz and Charles J. Smith, Jr., Niagara Falls, N.Y., assignors to Olin Mathieson Chemical Corporation, a corporation of Virginia
No Drawing. Filed Mar. 22, 1954, Ser. No. 417,962
2 Claims. (Cl. 260—543)

Our invention relates to a process for the manufacture of methyl dichlorophosphine oxide, $CH_3POCl_2$, referred to herein as "dichloride."

Methanol and phosphorus trichloride react at temperatures of about 0 to 20° C. to form dimethyl hydrogen phosphite according to the following equation:

$$3CH_3OH + PCl_3 \longrightarrow (CH_3O)_2\overset{O}{\overset{\|}{P}}-H + CH_3Cl + 2HCl$$

Pyrolysis of dimethyl hydrogen phosphite at temperatures of about 250° C. and higher, particularly in an atmosphere of nitrogen, yields a complex mixture known as "pyro mix" usually containing approximately the following proportion of principal components:

| Name | Formula | Approx. Percent |
|---|---|---|
| Methyl methane phosphinate | 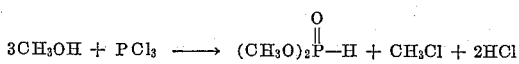 | 20–30 |
| Di(methyl phosphonic acid) | $CH_3-\overset{O}{\overset{\|}{P}}-O-\overset{O}{\overset{\|}{P}}-CH_3$ with OH, OH | 50–60 |
| Pyrophosphoric acid | $HO-\overset{O}{\overset{\|}{P}}-O-\overset{O}{\overset{\|}{P}}-OH$ with OH, OH | 15–20 |
| | | 100 |

"Dichloride" may be formed from the pyro mix by the action of chlorine and phosphorus trichloride or thionylchloride. Phosgene (carbonyl chloride) however is cheaply available in large quantities and would appear to be a particularly desirable reagent for the conversion of pyro mix to dichloride. It is more volatile than phosphorus trichloride and the phosphoryl chloride formed by that reagent. Carbon dioxide formed as a by-product in using phosgene is much less corrosive than the sulfur dioxide by-product of thionyl chloride.

In spite of the apparent advantages of using carbonyl chloride as reagent, the simple and direct batch treatment of the pyro mix at atmospheric pressure with phosgene results in the production of little or none of the desired product. In contrast to the use of thionyl chloride, a polymeric mixture is obtained when phosgene is bubbled through pyro mix. Furthermore no appreciable product formation occurs in the presence of most organic liquids. Those which react with acids and acid chlorides including the components of pyro mix, phosgene and the products of the reaction are unsuitable. With aliphatic and aromatic hydrocarbons, chloroform, carbon tetrachloride and pentachloroethane, for example, substantially none of the desired product is formed in the reaction between pyro mix and phosgene in several hours at atmospheric pressure.

The copending application of Earl A. Weilmuenster and Joseph J. Minnick, Serial No. 340,912, filed March 6, 1953, now abandoned, discloses a particularly advantageous method for the production of "dichloride" from pyro mix by dispersing the pyro mix in certain chlorinated hydrocarbon solvents and contacting the dispersion in liquid phase with phosgene at a temperature of 100° C. to 200° C. for a period of time sufficient for substantial conversion of the pyro mix to "dichloride" to take place. Among the chlorinated hydrocarbon solvents disclosed in the aforementioned application are beta-trichloro ethane, tetrachloroethane, ethylene dichloride and various chlorinated biphenyls. Although the method disclosed in the Weilmuenster and Minnick application just referred to provides a definite advance in the art of manufacturing "dichloride" from pyro mix, it nevertheless has the disadvantage that the reaction product is contaminated with the chlorinated hydrocarbon solvent used, so that the problem of recovering "dichloride" from the reaction mixture is made more difficult, and also that the chlorinated hydrocarbon solvent must either be recovered from the reaction mixture or lost.

The problem of finding additional solvents other than those contemplated by the aforementioned Weilmuenster and Minnick application which are suitable for use in the process is complicated, as has already been stated, by the fact that the solvent chosen must be one in which the desired reaction will take place, by the fact that the solvent chosen must be one which does not react with acids and acid chlorides including the components of pyro mix and phosgene, and by other factors. We have discovered, however, that "dichloride" itself has the desired properties for use in the phosgenation of pyro mix to form "dichloride," so that we have provided the art with a process possessing the advantages to be derived when a suitable solvent is used but at the same time presenting no solvent recovery problem.

As a specific illustration of an embodiment falling within the scope of our invention, 655 pounds per day of pyro mix consisting essentially of 20 percent by weight of methyl methane phosphinate, 20 percent by weight of pyro phosphoric acid and 60 percent by weight of di(methyl phosphonic acid) and having a temperature of about 125° C., 2554 pounds per day of phosgene (about 100 percent excess) and 6200 pounds per day of recycle "dichloride" in admixture with each other are introduced into a twenty gallon autoclave maintained at a temperature of about 300° F. and at a pressure of about 1500 p.s.i.g. The autoclave is a tantalum lined one provided with an agitator. Residence time in the autoclave is about 30 minutes. The effluent from the autoclave consists essentially of carbon dioxide, hydrogen chloride, methyl chloride, excess phosgene, phosphorus oxychloride, "dichloride" and tetramethylphosphonium chloride in a molar ratio of 12.9, 8.65, 1.39, 12.40, 1.96, 52.01 and 0.70, respectively.

The reaction products are fractionated in a first column operated at 150 p.s.i.a., carbon dioxide and hydrogen chloride being taken off overhead and methyl chloride, phosgene, phosphorus oxychloride, "dichloride" and tetramethylphosphonium chloride being taken off in the bottoms. The bottoms from the first column are introduced into a second column operated at 16 p.s.i.a. to produce an overhead consisting essentially of methyl chloride and phosgene and a bottoms consisting essentially of phosphorus oxychloride, "dichloride" and tetramethylphosphonium chloride. The bottoms from the second distillation column are introduced into a third distillation column operated at a pressure of 7.5 p.s.i.a. to produce an overhead consisting essentially of phosphorus oxychloride and a bottoms consisting essentially of "dichloride" and tetramethylphosphonium chloride. The bottoms from the third distillation column are then introduced into a fourth distillation column operated at a pressure of 1.5 p.s.i.a. to produce as an overhead "dichloride" of about 98 percent purity in the amount of 720 pounds per day.

Various modifications can be made in the specific procedure just described to provide other embodiments which fall within the scope of our invention. Thus, the relative amounts of pyro mix and "dichloride" used can be varied widely. However, the weight of the "dichloride" employed should exceed the weight of the pyro mix reacted with the phosgene, and preferably the ratio of the weight of "dichloride" to the weight of pyro mix is within the range from about 5:1 to about 25:1.

As is described in the Weilmuenster and Minnick application Serial No. 340,912, when the phosgene and pyro mix are reacted they appear to react in the proportions and to form the products shown by the following equations:

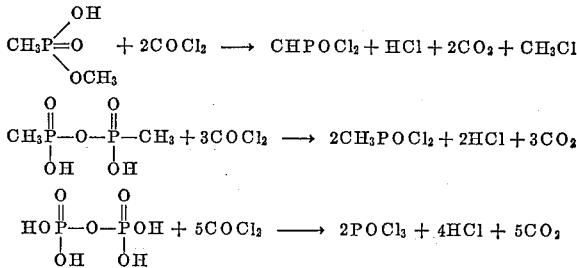

A mixture containing these three reactants in the proportions of 20, 60, 20 parts by weight, respectively, requires 1.93 parts by weight of phosgene to one part of the mixture calculated according to the equations above. As the specific illustration shows, it is desirable to use about twice the theoretical quantity. It is not necessary that this precise amount be used, however, and generally we prefer that the amount of phosgene introduced into the reaction mixture be from about 1.5 to about 3.0 times that theoretically required. Likewise, considerable variations are permissible with respect to the operating conditions of temperature and pressure employed. Usually, however, we prefer that the reaction temperature be within the range from about 200° F. to about 400° F. and that the reaction pressure be within the range from about 500 p.s.i.g. to about 5000 p.s.i.g., the use of elevated pressures being advantageous with respect to reaction rate.

As those skilled in the art will readily understand, the process of our invention can be carried out using various types of reaction equipment. Thus, the process can be practiced using a tubular reactor or a reaction tower, or other convenient reaction vessel, as well as the stirred autoclave utilized in the specific illustration.

We claim:

1. A process for the production of methyl dichlorophosphine oxide by chlorination of pyro mix, comprising a mixture of methyl methane phosphinate, di(methyl phosphonic acid) and pyrophosphoric acid, which comprises reacting the pyro mix in liquid phase with phosgene for a period of time sufficient to effect substantial conversion of the pyro mix to methyl dichlorophosphine oxide while the pyro mix is in admixture with methyl dichlorophosphine oxide not produced in the reaction in a weight amount exceeeding the weight of the pyro mix.

2. A process for the production of methyl dichlorophosphine oxide by chlorination of pyro mix, comprising a mixture of methyl methane phosphinate, di(methyl phosphonic acid) and pyrophosphoric acid, which comprises admixing the pyro mix with methyl dichlorophosphine oxide not produced in the reaction in a weight amount exceeding the weight of the pyro mix and contacting the mixture while in liquid phase with phosgene under elevated temperature and pressure conditions for a period of time effecting substantial conversion of the pyro mix to methyl dichlorophosphine oxide.

References Cited by the Examiner

Kinnear et al.: Journal of the Chemical Society (London), 1952, pages 3437–45.

LORRAINE A. WEINBERGER, *Primary Examiner.*

WILLIAM G. WILES, ROGER L. CAMPBELL,
*Examiners.*

UNITED STATES PATENT OFFICE
CERTIFICATE OF CORRECTION

Patent No. 3,200,145   August 10, 1965

Leland J. Lutz et al.

It is hereby certified that error appears in the above numbered patent requiring correction and that the said Letters Patent should read as corrected below.

Column 3, lines 15 to 18, the equation should appear as shown below instead of as in the patent:

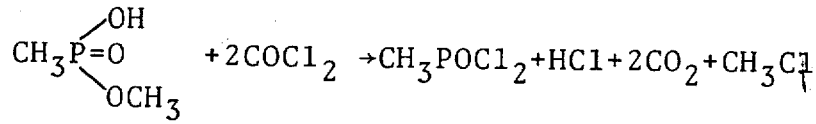

Signed and sealed this 16th day of August 1966.

(SEAL)
Attest:

ERNEST W. SWIDER
Attesting Officer

EDWARD J. BRENNER
Commissioner of Patents